Feb. 22, 1949.   G. W. MARTIN   2,462,272
STEERING STABILIZER
Filed Aug. 27, 1945   3 Sheets-Sheet 1
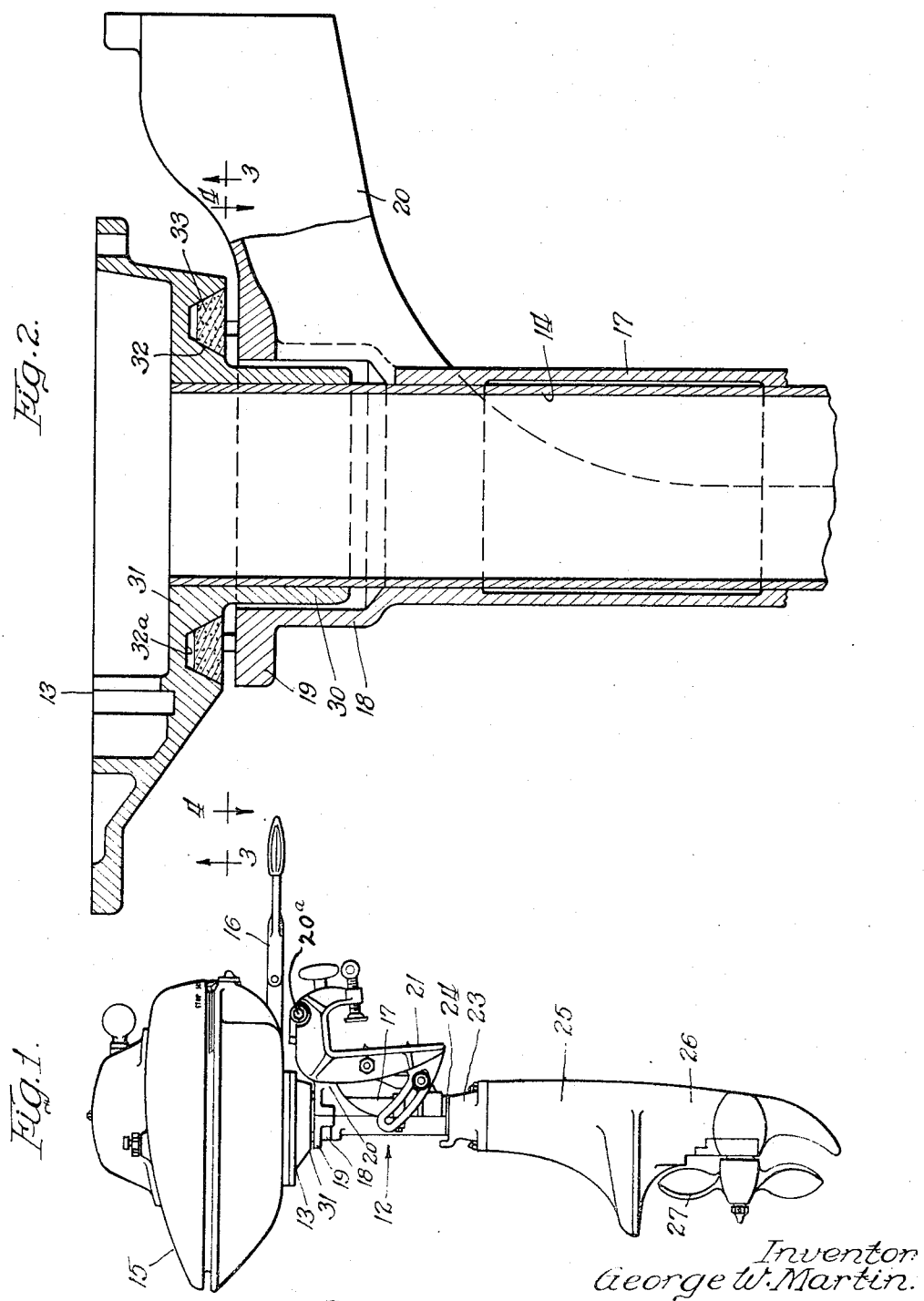

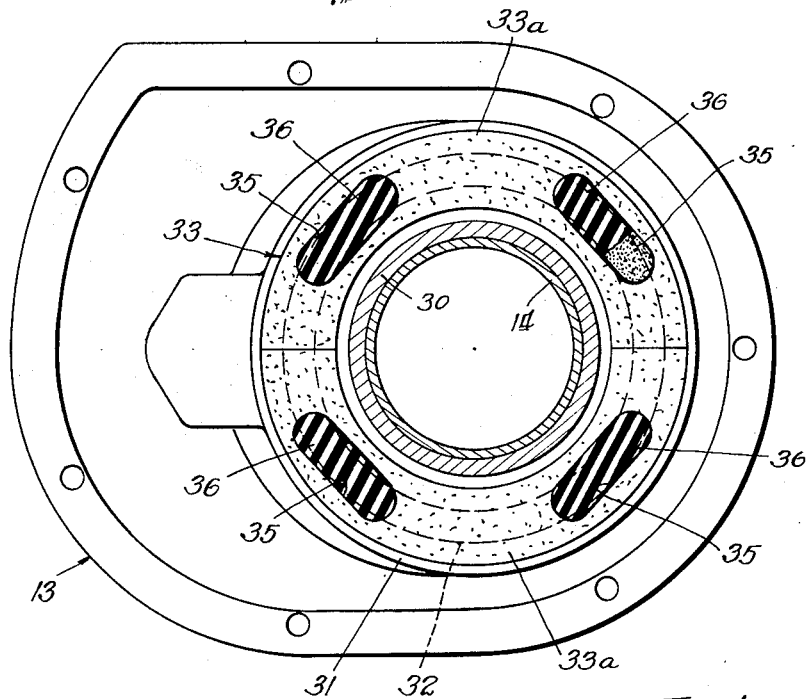
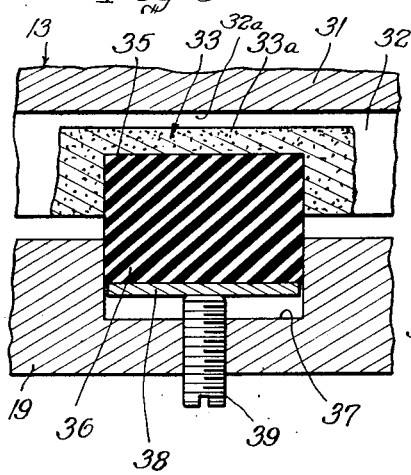
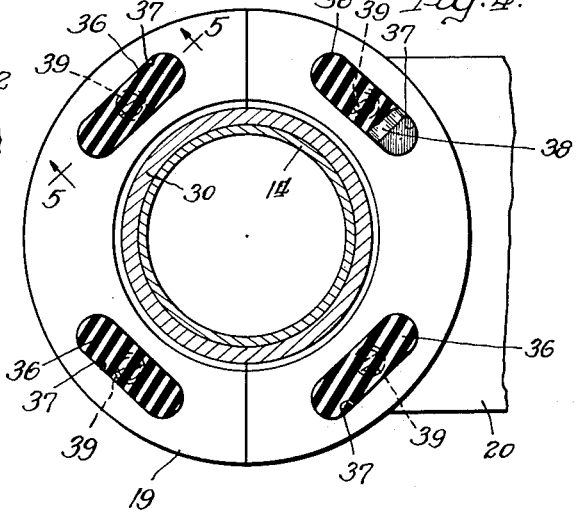

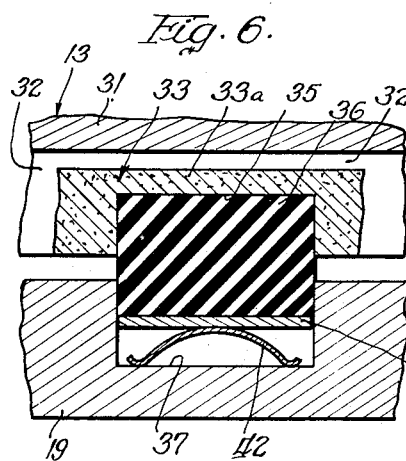
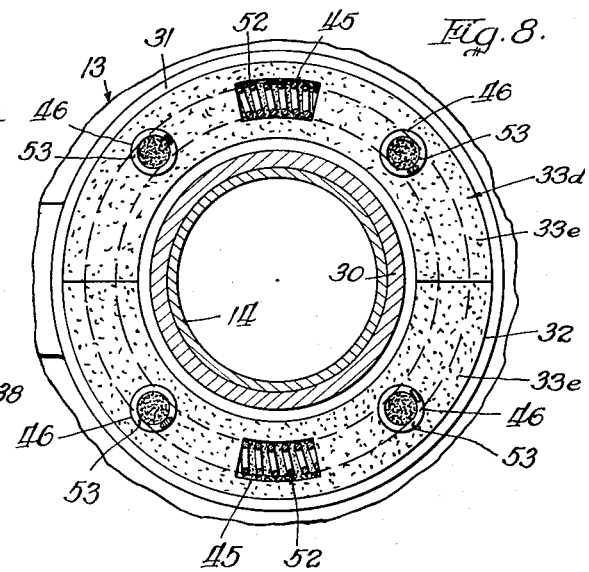
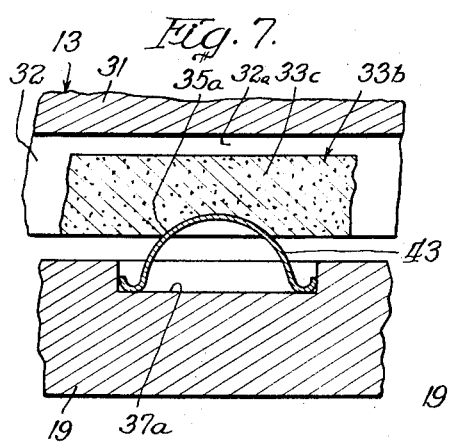
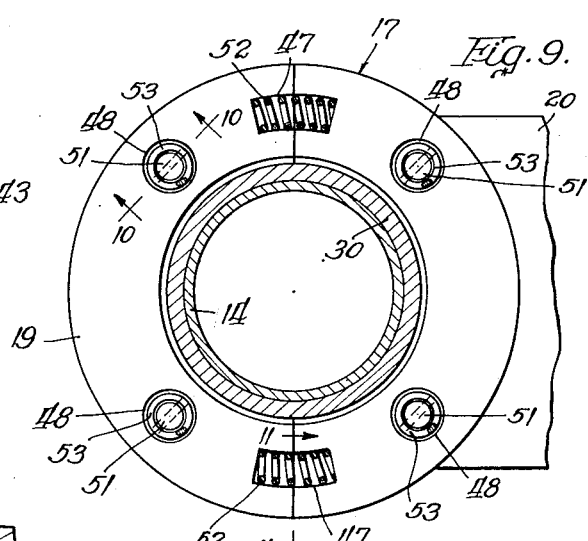
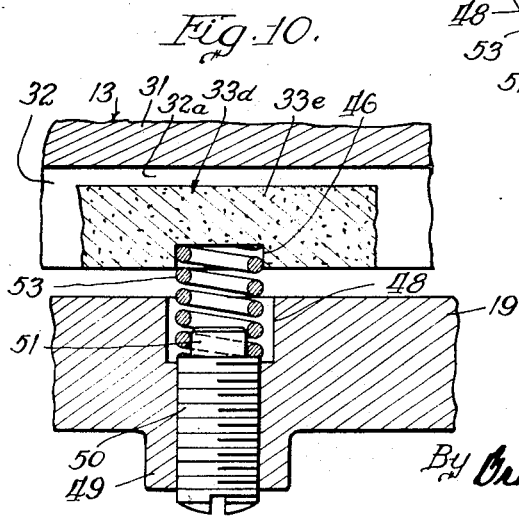
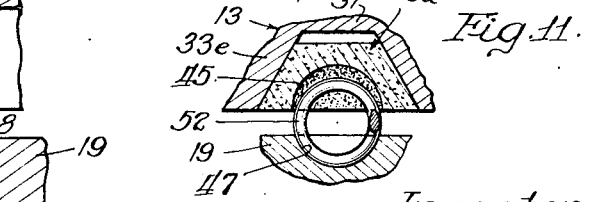

Patented Feb. 22, 1949

2,462,272

UNITED STATES PATENT OFFICE 2,462,272

STEERING STABILIZER

George W. Martin, Eau Claire, Wis.

Application August 27, 1945, Serial No. 612,939

14 Claims. (Cl. 248—4)

This invention relates to outboard motor units, and has to do with stabilizing means for holding the unit on a set course without interfering with its manipulation for steering purposes.

Outboard motor units ordinarily employ a motor of one or more cylinders having suitable driving connection to a propeller. The motor and the propeller and associated parts are carried by a motor support tube turnable in a tubular housing. Turning of the tube, for steering the boat on which the unit is mounted, is effected by a handle or tiller suitably secured to the unit, usually to the motor. If the motor operated at absolutely uniform speed, the unit would be in balance and there would be no tendency for it to turn about the steering axis. In practice, however, the instantaneous speed of the motor crank shaft varies during each revolution thereof, under the influence of the compression and power phases of the cycle in each cylinder. That results in alternate acceleration and deceleration in speed of the motor crank shaft, so that the motor itself tends to turn first in one direction and then in the opposite direction about the steering axis. This may be called motor torque vibration and is particularly evident at low speeds. In practice, appreciable friction is included in the steering system, to avoid sudden change in course due to striking an object, change in motor speed, or other causes. With friction present in the steering system, the motor torque vibration causes slow turning or creeping of the motor unit in one direction about the steering axis, unless means is provided to prevent such creeping.

It is known, in outboard motor units, to provide yielding means permitting the motor support tube to oscillate about its axis to a limited extent approximately equal to the natural amplitude of its motor torque vibration, in conjunction with friction means restraining turning of the tube, by motor torque vibration, beyond such limited extent. In that manner the motor unit is stabilized, creeping of the motor support tube is prevented, and the motor unit is maintained in desired angular adjustment on any desired course for which it may be set.

My invention is directed to an improved steering stabilizer of the general character above briefly described which is highly efficient in operation. I provide a stabilizer of comparatively simple construction, having means yieldingly opposing motor torque vibration and friction means restraining the motor support tube against turning by motor torque vibration, the latter means being readily adjustable to suit operating conditions. In addition, the means opposing motor torque vibration also provides a cushion support for the motor support tube and the parts carried thereby, guarding against transmission of objectionable vibration to the boat. A further advantage of the stabilizing means of my invention is that such means is so disposed as not to detract from the appearance of the motor unit and is effectively guarded thereby against damage or casual displacement or maladjustment. Further objects and advantages of my invention will appear from the detail description.

In the drawings:

Figure 1 is a side view of an outboard motor unit embodying my invention;

Figure 2 is an axial sectional view, on an enlarged scale, of the motor support tube and the housing therefor of the unit of Figure 1, with the lower portion thereof broken off and the clamping bracket arm partly broken away and shown in elevation;

Figure 3 is a sectional view taken substantially on line 3—3 of Figure 2;

Figure 4 is a sectional view taken substantially on line 4—4 of Figure 2, with the clamping bracket arm partly broken away;

Figure 5 is a fragmentary sectional view, on an enlarged scale, of the assembly of Figure 2, taken substantially on line 5—5 of Figure 4, certain parts being shown in elevation;

Figure 6 is a view similar to Figure 5 but showing a modification of my invention;

Figure 7 is a view similar to Figure 5 but showing a second modification of my invention;

Figure 8 is a view similar to Figure 3, with parts broken away and showing a third modification of my invention;

Figure 9 is a view similar to Figure 4 but showing the modification of Figure 8;

Figure 10 is a sectional view similar to Figure 5, on an enlarged scale, taken substantially on line 10—10 of Figure 9, showing the modification of Figures 8 and 9, certain parts being shown in elevation; and Figure 11 is a sectional view of the upper end of the motor support tube and housing assembly of Figures 8 and 9, taken substantially on line 11—11 of Figure 9, on an enlarged scale.

I have illustrated my invention, by way of example, as embodied in an outboard motor unit 12, which may be of any suitable known construction, except as to those features having to do particularly with my invention. The unit 12 comprises a motor, such as a two-cylinder internal combustion engine, enclosed in a suitable housing and bolted to a flanged base 13 secured on the upper end of a motor support tube 14, the motor and its enclosing housing being indicated by the reference number 15. A steering handle or tiller 16 is bolted or otherwise suitably secured to the motor, as is known. The motor support tube 14 is journaled through a tubular housing 17, conveniently formed in two substantially semi-cylindrical sections bolted together about the tube 14. Housing 17 is provided at its upper end with an element 18 of increased diameter having at its upper end an outwardly extending circumferential flange 19, and is also provided with an outwardly extending arm 20 fixed thereto, preferably integral with one section of the housing 17. A clamping bracket 21, suitably mounted on the outer end of arm 20, is provided for securing the unit 12 to the sill or transom at the stern of a boat, as is known. Suitable means may be provided in conjunction with the clamping bracket 21 for adjusting housing 17 about a horizontal axis so as to dispose it and the motor support tube 14 in substantially vertical position, in accordance with known practice. The particular construction of the clamping bracket 21 and associated parts is not essential to my invention. Suffice it to say that suitable clamping means is provided for securing the outboard unit to a boat in proper position thereon. The motor support tube 14 and the parts carried thereby constitute a power propulsion unit, which is rotatably mounted by the housing 17 and bracket 21 for steering purposes.

A flanged fitting 23 is fixed on the lower end of motor support tube 14 at the lower end of housing 17, with an intervening washer 24. The fitting 23 is bolted to an intermediate housing 25 and a gear case 26 carrying the propeller shaft and the propeller 27 thereon, the drive shaft extending downward from the motor through tube 14 and intermediate housing 25 into gear case 26, the latter containing gearing establishing driving connection between the drive shaft and the propeller shaft; all as is well known in the art. The particular construction of the intermediate housing 25 and the gear case 26 and the associated parts is not essential to my present invention and any other suitable construction of such parts may be employed. Briefly, my invention is applicable to an outboard motor unit comprising a housing, and a motor support tube mounted in the housing for relative turning movement and carrying a motor at its upper end having suitable driving connection to a propeller adjacent the lower end of what may be termed the under-water unit carried by the tube 14 for turning movement therewith. The tiller 16 provides means for turning the tube 14 in desired direction thereby moving the propeller 27 into various positions for steering the boat as desired, as is well understood.

The motor mounting base 13 comprises a neck 30 extending downward therefrom, into enlargement 18 of housing 17 and fixed on the upper end portion of tube 14, and a circumferential flange 31 overlying flange 19. Flange 31 is provided in its under face with an annular groove 32 concentric with tube 14, this groove being of rounded, rectangular, or substantially flattened V-shape in cross section as may be desired. I have here shown it of flattened V-shape. The groove 32 receives a friction block 33 shaped conformably thereto. If block 33 is of rounded or of rectangular cross section, it may fit snugly within groove 32. When block 33 is of flattened V cross section, as shown, groove 32 preferably is of greater depth than the height of block 33, providing clearance 32ª thereabove. Block 33 is formed in two sections semi-circular in plan and of suitable friction material, such as a suitable known brake lining material or molded plastic. It will be seen that both groove 32 and block 33 taper upward, so that by applying a given upward pressure to block 33 the effective frictional contact thereof with the walls of groove 32 may be substantially increased. In any case, by increasing or decreasing the upward pressure applied to block 33, the effective friction contact thereof with the walls of groove 32 may be increased or decreased.

As is shown more clearly in Figures 3, 4 and 5, each of the sections 33ª of block 33 is provided, in its under face, with two substantially oblong recesses 35 which receive the upper portions of blocks 36, formed of rubber or other suitable elastic material, the lower portions of which seat in corresponding recesses 37 formed in the upper face of flange 19 of housing 17. Each of the blocks 36 seats, at its lower end, on a pressure plate 38, preferably formed of steel, fitting snugly within recess 37, and seating, at its central area, on the upper end of an adjusting screw 39 threading through flange 19, from the lower face thereof, into recess 37.

It will be seen that the blocks 36 constitute cushion members supporting the motor support tube 14 and the parts carried thereby from flange 19 of housing 17, serving to damp out vibrations from the motor and to prevent transmission to an objectionable extent of motor vibration to the boat. The blocks 36 also provide, in conjunction with flange 19 and friction block 33, means yieldingly opposing turning of tube 14 relative to housing 17 by motor torque vibration, while permitting limited turning of tube 14 in either direction, thereby largely damping out and preventing tendency to creeping of tube 14 by motor torque vibration. In practice, the screws 39 are so adjusted that the pressure contact between friction block 33 and the walls of groove 32 is just sufficient to prevent creeping. In that manner assurance is had that the tube 14 and the parts carried thereby are frictionally held in position for propelling the boat on a given course, and the tube 14 may readily be turned by the tiller 16, without undue exertion, for changing course. During turning of tube 14 for changing course, the blocks 36 are distorted to a greater extent than is required for restricting turning of tube 14 by motor torque vibration, until slippage of the friction block 33 in groove 32 occurs. Upon release of the turning pressure applied to the tiller 16, the rubber blocks 36 resume their normal function of opposing turning of tube 14 by motor torque vibration, as above described.

In the modification shown in Figure 6, each of the rubber blocks 36 is urged upward by a bowed leaf spring 42 seating in recess 37 of flange 19. The springs 42 are of proper strength to suit the particular motor used, and the rubber blocks 36 cooperate with the friction block 33 and flange 19 in the manner above described with reference to Figures 1 to 5, inclusive.

In the modification of Figure 7, the friction block 33ᵇ, comprising two sections 33ᶜ semi-circular in plan, is provided with recesses, one of which is shown at 35ª, generally corresponding to but much shallower than the recesses 35 of Figures 3 and 5 and curved or arched lengthwise. The flange 19 of housing 17 is provided with recesses, one of which is shown at 37ᵃ, corresponding to but of less depth than the recesses 37 of Figures 4 and 5. A bowed leaf spring 43 seats in each of the recesses 37ᵃ and extends therefrom upward into a corresponding recess 35ᵃ, with its mid-portion in pressure contact with the friction block 33ᵇ at the top of recess 35ᵃ. The springs 43 provide a cushion support for the tube 14 and the parts carried thereby, as before, and, in conjunction with block 33ᵇ, frictionally and yieldingly oppose turning of tube 14 by motor torque vibration, substantially in the manner previously described with respect to the rubber blocks 36. The springs 43ᵃ are selected as to strength to suit the motor of the unit embodying such springs, and are effective for permitting limited oscillation of tube 14 by motor torque vibration, as before, the friction block 33ᵇ cooperating with flange 31 to hold the tube 14 against creeping due to motor torque vibration while permitting ready turning of the tube manually for steering, in the manner above described.

In the modification shown in Figures 8 to 11, inclusive, friction block 33ᵈ, formed in two semicircular sections 33ᵉ, is provided, at the mid-portion of each section thereof, with a recess 45 in its under face, of oblong shape in plan and arcuate cross section. Each of the sections 33ᵉ of friction block 33ᵈ is further provided in its under face with two shallow cylindrical recesses 46, disposed between recess 45 and the ends of sections 33ᵉ. The flange 19 of housing 17 is provided in its upper face with two recesses 47 corresponding to and underlying recesses 45, and with four cylindrical recesses 48 normally coaxial with recesses 46 of friction block 33ᵈ. Flange 19 is further provided, at its under face, with four bosses, one of which is shown at 49, respectively aligned with the recesses 48 and suitably bored and tapped for reception of adjusting screws, one of which is shown at 50. Each of the screws 50 is provided at its upper end with a reduced stud or tip 51 of materially less diameter than the recess 48, which is of somewhat greater diameter than its corresponding recess 46 in friction block 33ᵈ. Each of the recesses 45 of friction block 33ᵈ receives the upper portion of a coil compression spring 52 seating therein under endwise compression, the lower portion of this spring seating in the corresponding recess 47 in flange 19. Each of the recesses 46 in friction block 33ᵈ receives the upper end of a vertically disposed coil compression spring 53, seating snugly but not tightly in recess 46, this spring extending downward into recess 48 and seating snugly about tip 51, with its lower end bearing on the upper shoulder of screw 50.

The horizontal compression springs 52 yieldingly oppose turning of tube 14 in either direction, while permitting limited oscillation thereof by motor torque vibration. The action of the springs 52 is supplemented by springs 53 which, by lateral deflection, also yieldingly oppose to a certain extent turning of the tube 14 by motor torque vibration. The extent of compression of the springs 53 may be adjusted by screws 50, whereby the pressure contact between friction block 33ᵈ and the walls of groove 32 may readily be adjusted, as and for the purposes above stated.

I have illustrated and described the stabilizer of my invention as applied to an outboard motor unit in which the motor support tube is turnable in a mounting housing therefor, the steering axis being coincident with the axis of the tube. It is to be understood, however, that such illustrated embodiment is by way of example only, and that in its broader aspects my invention is applicable to outboard motor units otherwise mounted. In the so-called king pin type of unit, steering is accomplished by turning the motor support tube and the parts carried thereby about a pivot axis which is not coincident with the axis of the motor support tube or the drive shaft. The stabilizer of my invention is applicable to the king pin type of unit in substantially the same manner as that above described.

As above indicated, and as will be understood by those familiar with outboard motor units and stabilizing means therefor, changes in construction and arrangement of parts of my invention may be resorted to without departing from the field and scope thereof, and I intend to include all such variations, as fall within the scope of the appended claims, in this application in which the preferred forms only of my invention have been disclosed.

I claim:

1. In a steering stabilizer for outboard motor units, a non-rotatable tubular housing having a circumferential flange at its upper end, a motor support tube turnable in said housing having a motor mounting member overlying said flange, a friction member contacting the under face of said mounting member and spaced above said flange, and resilient members confined under compression between and having positive connection to said flange and said friction member, said resilient members presenting yielding resistance to rotation of said tube supplementary to the resistance presented by the frictional contact between said friction member and said mounting member.

2. In a steering stabilizer for outboard motor units, a non-rotatable tubular housing, a motor support tube turnable in said housing having at its upper end a motor mounting member, friction means engaging said mounting member and spaced above said flange, and yielding means connecting said friction means to said housing confined therebetween and permitting limited turning in either direction of said tube by motor torque vibration, said friction means restraining turning movement of said tube by motor torque vibration beyond such limited extent, while permitting turning of said tube to any desired extent in either direction by turning force applied thereto materially greater than that of motor torque vibration.

3. In a steering stabilizer for outboard motor units, a non-rotatable tubular housing, a motor support tube turnable in said housing having a motor mounting member overlying the upper end of said tube provided in its under face with a groove concentric with said tube, a friction block fitting in said groove and spaced above said housing, and resilient means confined between and connecting said block and housing yieldingly resisting turning movement of the tube in said housing in either direction by motor torque vibration.

4. In a steering stabilizer for outboard motor units, a non-rotatable tubular housing having a circumferential flange at its upper end provided with recesses in its upper face, a motor support tube turnable in said housing having a motor mounting member overlying said flange provided in its under face with a groove concentric with said tube, a friction block fitting in said groove having recesses in its under face, and resilient members extending between said flange and said block seating in the recesses thereof yieldingly resisting turning of said tube in said housing in either direction by motor torque vibration.

5. In a steering stabilizer for outboard motor units, a non-rotatable tubular housing having a circumferential flange at its upper end provided with recesses in its upper face, a motor support tube turnable in said housing having a motor mounting member overlying said flange provided in its under face with a groove concentric with said tube, a friction block fitting in said groove having recesses in its under face, and resilient blocks of elastic rubber-like material extending between said flange and said friction block seating in the recesses thereof yieldingly resisting turning of said tube in said housing in either direction by motor torque vibration.

6. In a steering stabilizer for outboard motor units, a non-rotatable tubular housing having a circumferential flange at its upper end, a motor support tube turnable in said housing having a motor mounting member overlying said flange, a friction member contacting the under face of said mounting member, resilient members confined under compression between said flange and said friction member anchored at their ends thereto and yieldingly resisting turning movement of said tube in either direction by motor torque vibration, and adjustable means for varying the extent of compression of said resilient members and thereby varying the frictional resistance to turning of said tube.

7. In a steering stabilizer for outboard motor units, a non-rotatable tubular housing having a circumferential flange at its upper end provided with recesses in its upper face, a motor support tube turnable in said housing having a motor mounting member overlying said flange provided in its under face with an upwardly tapering groove concentric with said tube, a friction block fitting in said groove having recesses in its under face, and resilient members extending between said flange and said block seating in the recesses thereof yieldingly resisting turning of said tube in said housing in either direction by motor torque vibration.

8. In a steering stabilizer for outboard motor units, a non-rotatable tubular housing having a circumferential flange at its upper end provided with recesses in its upper face, a motor support tube turnable in said housing having a motor mounting member overlying said flange provided in its under face with a groove concentric with said tube, a friction block fitting in said groove having recesses in its under face, resilient blocks of elastic rubber-like material extending between said flange and said friction block seating in the recesses thereof yieldingly resisting turning of said tube in said housing in either direction by motor torque vibration, and bowed leaf springs in the recesses of said flange beneath said resilient blocks exerting upward pressure thereon.

9. In a steering stabilizer for outboard motor units, a non-rotatable tubular housing having a circumferential flange at its upper end provided with recesses in its upper face, a motor support tube turnable in said housing having a motor mounting member overlying said flange provided in its under face with a groove concentric with said tube, a friction block fitting in said groove having recesses in its under face, and bowed leaf springs extending between said flange and said block seating in the recesses thereof and in cooperation therewith yieldingly resisting turning of said tube in said housing in either direction by motor torque vibration.

10. In a steering stabilizer for outboard motor units, a non-rotatable tubular housing having a circumferential flange at its upper end provided with recesses in its upper face, a motor support tube turnable in said housing having a motor mounting member overlying said flange provided in its under face with a groove concentric with said tube, a friction block fitting in said groove having recesses in its under face corresponding to the recesses of said flange, horizontal coil springs between said flange and said mounting member seating in certain of the recesses thereof under endwise compression, stud screws threading through said flange from beneath with the studs thereof extending upward into the other recesses of said flange in concentric spaced relation thereto, and coil springs seating at their lower ends on said screws about the studs thereof and at their upper ends in the corresponding recesses of said block and confined between the latter and said screws under endwise compression.

11. In a steering stabilizer for outboard motor units, a non-rotatable member, a motor support tube having a mounting flange fixed thereto overlying said non-rotatable member, a friction member contacting the under face of said flange and spaced above said non-rotatable member, and resilient members confined under compression between and attached to said friction member and said non-rotatable member in cooperation therewith supporting said flange for turning movement about a steering axis relative to said non-rotatable member, said resilient members in cooperation with said friction member providing for limited turning movement of said flange in either direction by motor torque vibration and for turning movement of said flange to any desired extent in either direction by turning force applied to said flange materially greater than that of motor torque vibration.

12. In a steering stabilizer for outboard motor units a non-rotatable member, a motor support tube turnable in said member having a mounting member fixed thereto overlying said non-rotatable member, a friction block in friction contact with one of said members, and resilient means confined under compression between and attached to said block and the other of said members providing yielding resistance to turning of said tube relative to said non-rotatable member supplementary to the frictional resistance to such turning of said tube provided by frictional contact between said block and said one member.

13. In a steering stabilizer for outboard motor units, a non-rotatable member, a motor support tube turnable in said member, and means mounting said tube on said member comprising resilient means and friction means attached thereto whereby said tube has relative turning movement in either direction by motor torque vibration limited in extent by said resilient means and is frictionally held against turning movement in either direction beyond such limited extent while being turnable to any desired extent in either direction by turning force applied thereto materially greater than that of motor torque vibration, said resilient means supporting said tube providing a cushion mounting therefor.

14. In a steering stabilizer for outboard motor units, a non-rotatable member, a motor support tube turnable in said member having a mounting member fixed thereto overlying said non-rotatable member, and means disposed between said members comprising resilient means and friction means having friction contact with one of said members, said resilient means being attached to the other member and to said friction means confined under compression therebetween, said resilient means accommodating turning movement of said tube in either direction to limited extent by motor torque vibration relative to said non-rotatable member and said tube being held by said friction means against turning movement by motor torque vibration in either direction beyond such limited extent while being turnable in either direction beyond said limited extent by turning force applied thereto in excess of motor torque vibration.

GEORGE W. MARTIN.

REFERENCES CITED

The following references are of record in the file of this patent:

UNITED STATES PATENTS

| Number | Name | Date |
|---|---|---|
| 1,932,785 | Irgens | Oct. 31, 1933 |
| 2,044,920 | Smith | June 23, 1936 |
| 2,354,445 | Grubbs | July 25, 1944 |